(12) United States Patent
Rudolph

(10) Patent No.: US 10,739,740 B2
(45) Date of Patent: Aug. 11, 2020

(54) METHOD FOR OPERATING AN ELECTRICAL SWITCHING DEVICE WITHIN AN ELECTRICAL SWITCHGEAR SYSTEM

(71) Applicant: SCHNEIDER ELECTRIC INDUSTRIES SAS, Rueil-Malmaison (FR)

(72) Inventor: Thomas Rudolph, Rosbach v.d.H. (DE)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 16/463,545

(22) PCT Filed: Nov. 22, 2017

(86) PCT No.: PCT/EP2017/079996
§ 371 (c)(1),
(2) Date: May 23, 2019

(87) PCT Pub. No.: WO2018/095944
PCT Pub. Date: May 31, 2018

(65) Prior Publication Data
US 2019/0377308 A1    Dec. 12, 2019

(30) Foreign Application Priority Data

Nov. 28, 2016 (DE) .................. 10 2016 122 907

(51) Int. Cl.
*G05B 15/02* (2006.01)
*G08C 17/02* (2006.01)
(52) U.S. Cl.
CPC ............. *G05B 15/02* (2013.01); *G08C 17/02* (2013.01); *G08C 2201/93* (2013.01)

(58) Field of Classification Search
None
See application file for complete search history.

(56) References Cited

U.S. PATENT DOCUMENTS 8,910,249 B2    12/2014  Rudolph
10,553,055 B2 *  2/2020  Holighaus .......... G07C 9/00182
(Continued)

FOREIGN PATENT DOCUMENTS

EP    2 034 378 A2    3/2008
EP    2 224 295 A1    9/2010
EP    2 505 966 A1    10/2012

OTHER PUBLICATIONS

International Search Report dated Feb. 15, 2018 in PCT/EP2017/079996 (with English Translation), 7 pages.

(Continued)

*Primary Examiner* — Thomas S McCormack
(74) *Attorney, Agent, or Firm* — Oblon, McClelland, Maier & Neustadt, L.L.P.

(57) ABSTRACT

The invention relates to a method for operating an electrical switching device within an electrical switchgear system, by way of which existing disadvantages can be eliminated, and a secure and protected operation of the electrical switching device outside a potential hazard field can be made possible. The electrical switching device is operated by an operator by means of a mobile electrical device, which communicates wirelessly with the electrical switching device. In a first step, the operator reads a first identification means with the use of the mobile electrical device in order to unequivocally identify the electrical switching device to be operated. In a second step, a second identification means is read with the use of the mobile electrical device in order to unequivocally identify a protected operator location. In a third step, the operator is authorized to operate the identified electrical (Continued)

Figure 1:
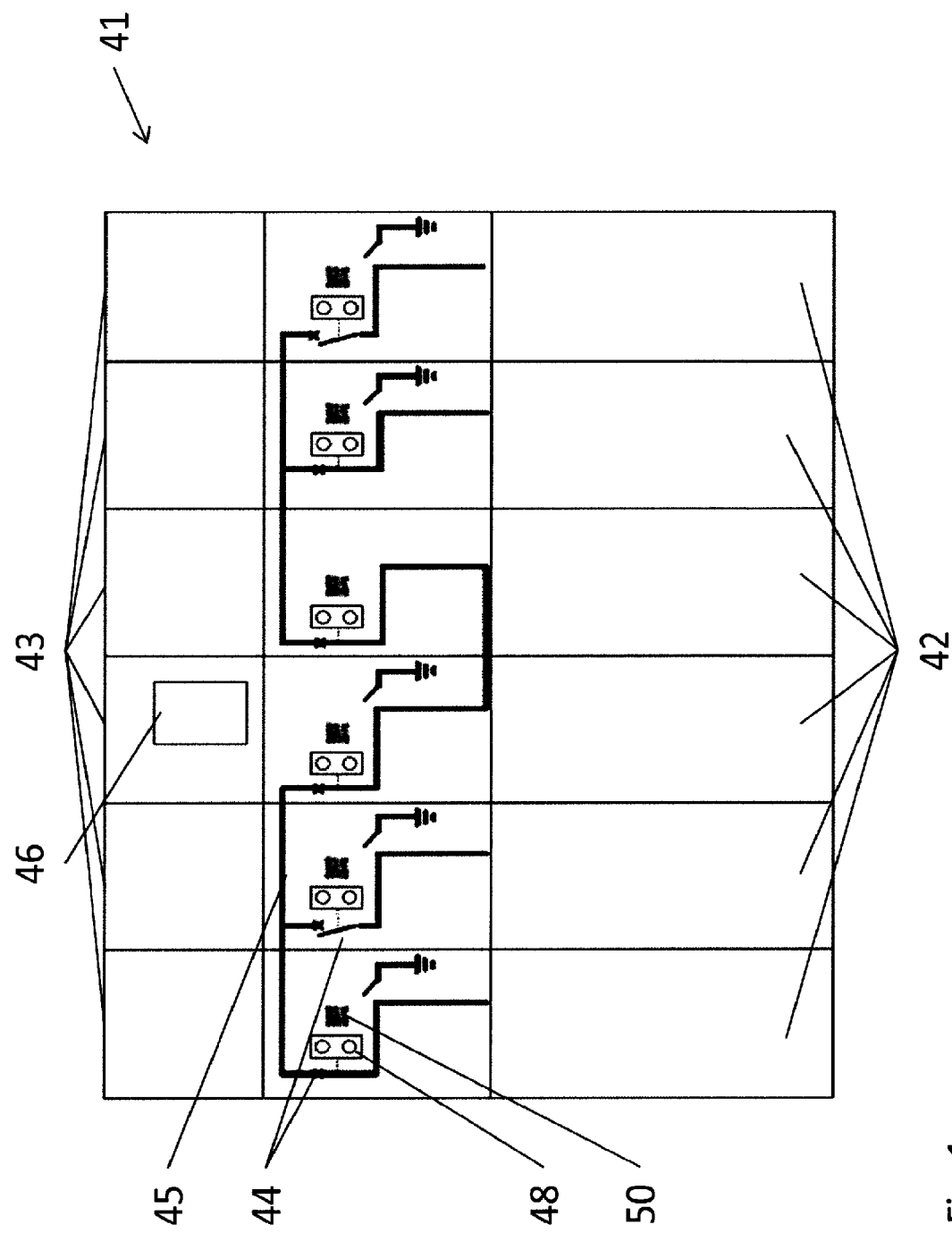

switching device with the use of the mobile electrical device, when the operator is located at the identified operator location.

10 Claims, 3 Drawing Sheets

(56) References Cited

U.S. PATENT DOCUMENTS

| | | |
|---|---|---|
| 2002/0091784 A1 | 7/2002 | Baker et al. |
| 2010/0217409 A1 | 8/2010 | Ebner |
| 2012/0019357 A1* | 1/2012 | Rosenthal ................ G07C 9/27 340/5.61 |
| 2012/0254952 A1 | 10/2012 | Rudolph |
| 2013/0231779 A1 | 9/2013 | Purkayastha et al. |
| 2014/0132393 A1* | 5/2014 | Evans .................... G08B 25/14 340/6.11 |
| 2016/0171360 A1* | 6/2016 | Rettich ................. G06Q 10/20 235/494 |

OTHER PUBLICATIONS

Search Report dated Mar. 26, 2020 in German Application No. 10 2016 122 907.5.

* cited by examiner

METHOD FOR OPERATING AN ELECTRICAL SWITCHING DEVICE WITHIN AN ELECTRICAL SWITCHGEAR SYSTEM

The invention relates to a method in accordance with the preamble of claim 1 for operating an electrical switching device within an electrical switchgear system.

Depending on the intended user, there is frequently the demand with electrical switchgear systems in electrical supply networks for a safe and protected operation of individual switching devices to prevent operators from being exposed to potential hazard situations during switching procedures. Electrical switching devices can, for example, be circuit breakers, cut-off switches, grounding switches, breakers and/or transducers.

There is, for example, a hazard potential in air-insulated switchgear systems due to the possibility of arcing and a thus associated risk of injury to the operator. Manual operating errors can be restricted by safety mechanisms, while arcs can be detected and reduced as part of arc protection measures. However, a residual risk remains.

Separately arranged control centers/control rooms are known to provide a safe and protected environment for an operation of switching devices. These control centers/control rooms are preferably located in the surroundings of the switchgear system, ideally such that there is visual contact to the respective switching device. These solutions are, however, too complex and too expensive for switchgear systems in the medium voltage and low voltage ranges. The stationary arrangement of system-specific operating panels at a safe location is also complex with respect to costs and installation.

It is furthermore known to use mobile, wirelessly communicating electrical devices such as tablets or smartphones as spatially independent control devices for electrical switching devices. An active and/or passive data exchange with the switching device can be generated on the part of the operator by means of such mobile electrical devices.

In addition to operation safety, the demand for a secure data transfer in the use of such mobile devices for electrical switchgear systems is also important. U.S. Pat. No. 8,910,249 B2 describes a way toward a secure data exchange between a mobile device and an electronic control of a switchgear system. US 20020091784 A1 describes the general principle for a remote connection of intelligent electronic devices using a web interface.

The control of a short-circuit cut-off for an electrical load socket by means of a mobile electrical device is furthermore known. An application program (app) is used on the mobile electrical device to reliably identify the respective socket and to enable the switching action. An associated QR code of the socket in particular has to be read into the app here.

It is the object of the present invention to provide a method of operating an electrical switching device within an electrical switchgear system of the initially named kind in which the above-named disadvantages can be eliminated and in which a safe and protected operation of the switching device outside a potential hazard zone can be made possible.

This object is satisfied by the features set forth in claim 1. Advantageous embodiments results from the dependent claims.

The invention in accordance with claim 1 relates to a method of operating an electrical switching device within an electrical switchgear system.

To be able to reliably and safely operate an electrical switching device outside a system-specific hazard region, the use of a mobile electrical device is proposed by means of which it is possible to communicate with an electrical control device of the electrical switching device. In accordance with the invention, an operation within the hazard region is not possible due to unambiguously defined security queries.

The distance between the electrical switching device and an operator can be designed as sufficiently large so that a presence of the operator within the system-specific hazard region can be securely avoided during a switching action triggered on the part of the operator. There is the possibility due to the use of a mobile electrical device that the operator works in the vicinity of the switching device, but is sufficiently far away from the switching device under safety aspects. While taking these safety-relevant criteria into account, an operating location for the switching operation of an electrical switching device is determined and is correspondingly marked.

The method in accordance with the invention can comprise at least two security queries. In a first step, the switching device to be operated within a switchgear system can be selected and identified. To trigger a switching action, the correct and protected operating location for the control of the selected switching device must subsequently be identified and confirmed in a second step. The triggering of a switching action is only possible from this location. A high safety potential results from this method since the execution of defined switching actions of the respective switching device is not possible in an unprotected region. The wireless operating option of switching devices is extended by the invention by an additional step that ensures protection and safety by a positively driven identification of the switching device and of the operating location.

The identification of the switching device and of the operating location can preferably take place optically by device-specific identification means. A simple and inexpensive technology for the identification in two steps is the use of so-called QR codes whose graphical patterns represent device-specific information. The use of different identification means is likewise possible. The use of such singular identification means increases the reliability and security of the method.

The mobile electrical devices, for example a table or a smartphone, for performing the method in accordance with the invention are not installed in a stationary manner and can be operated at different locations. Wireless control components and software solutions are used for data exchange between the mobile electrical device and the electrical switching device or the control device. Wireless transmission techniques can e.g. be wireless LAN, Bluetooth, or NFC.

In accordance with a special embodiment, the spatial association of the operator with the electrical switching device and with the operating location can also be supplemented by or replaced with position determination processes, for example using (satellite-supported) GPS data, cellular radio masts, or wireless LAN routers. However, a sufficiently exact precision is required for this purpose to in particular be able to ensure the required safety distance of the operating location from the switching device.

A protected data communication can also be implemented in addition to the safety of the operator by the use of identification means at the switching devices and at the operating location since the data transmission from and to the mobile electrical device is only possible on a correct validation of the information content of the identification means. In addition, the data communication can be protected from unauthorized access by encryption technologies. Further security measures can be provided by different access authorizations for different operators.

A first identification means is installed at the corresponding housing unit at each electrical switching device within an electrical switchgear system that can be operated in accordance with the method in accordance with the invention. This first identification means can be used to identify the switching device to be operated within the switchgear system, with the specific identification being able to be carried out on the mobile electrical device with corresponding application software. The device selection can also take place by an electronically issued work job, for example by a control center. The identification means can in this case optionally be used to validate the work job. Data communication can be released and the information exchange with the electronic control unit of the switching device can be started by the reading of the first identification means into the program of the mobile electronic device. A validation with respect to the correct selection of the switching device can take place here on the basis of the identification means of the switching device and of the corresponding message on the part of the application software on the mobile electrical device. A confirmation of the device connection that has taken place can furthermore be sent to the mobile electrical device while transmitting the reference data of the electrical switching device, of the system status, and of further relevant details. The operator can in turn confirm the transmitted information. Optionally, a block of commands and/or switching actions by other operators can be sent to the control device of the electrical switching device here or at another time during the carrying out of the method in accordance with the invention.

After the above-described communication on the reading of the first identification means of the respective switching device, the mobile electrical device is able to take over the control of the switching device. The execution of commands and/or switching actions can only take place if the operator has identified himself over the mobile electrical device at the protected operating location by reading the associated second identification means arranged there. The switching release can be issued by on the part of the electrical control device by reading this second identification means so that the switching device can be operated from the protected position.

After this release, a confirmation query relating to the correct association of both identification means and a query with respect to the status of the switching device can take place. The release confirmation by the second identification means ensures that the operator continues to be present at the protected operator location on the performance of the switching action. The repeated status query of the switching device after reading the second identification means enables a report on a status change within the time period between the two identification steps.

The solution in accordance with the invention is suitable for electrical switching devices in electrical switchgear systems both in the range of low voltage, of medium voltage, and of high voltage. Depending on the application, the solution can be implemented for air-insulated switchgear systems and also with gas-insulated switchgear systems, irrespective of the general situation that the problem of arcing does not occur with gas-insulated switchgear systems since there is a complete insulation. A further use possibility is provided by electrical machinery or electrical switchgear systems whose operation has hazard potential or that operate at a hazardous operating site. If no electrically controllable switching devices or if unsuitable electrically controllable switching devices are present in existing switchgear systems, corresponding wirelessly communicating electrical control devices can be retrofitted.

Further details, features and advantages of the invention result from the following description of a preferred embodiment with reference to the drawings.

Figure 2:
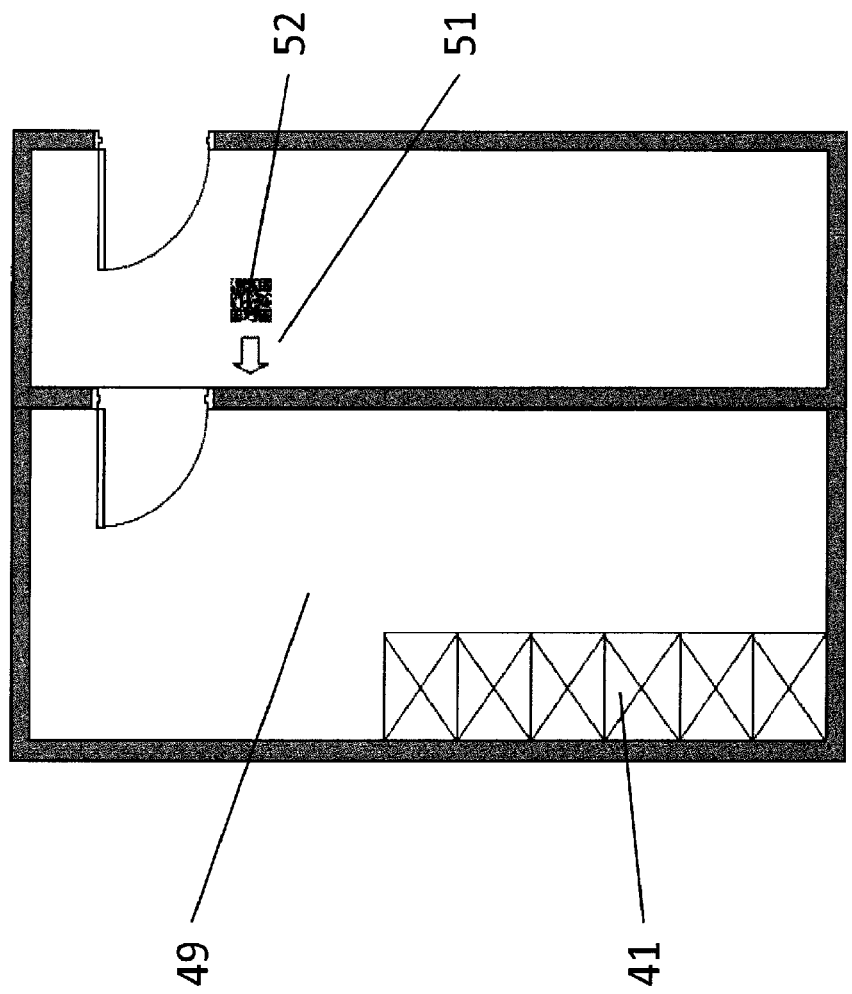
Figure 3:
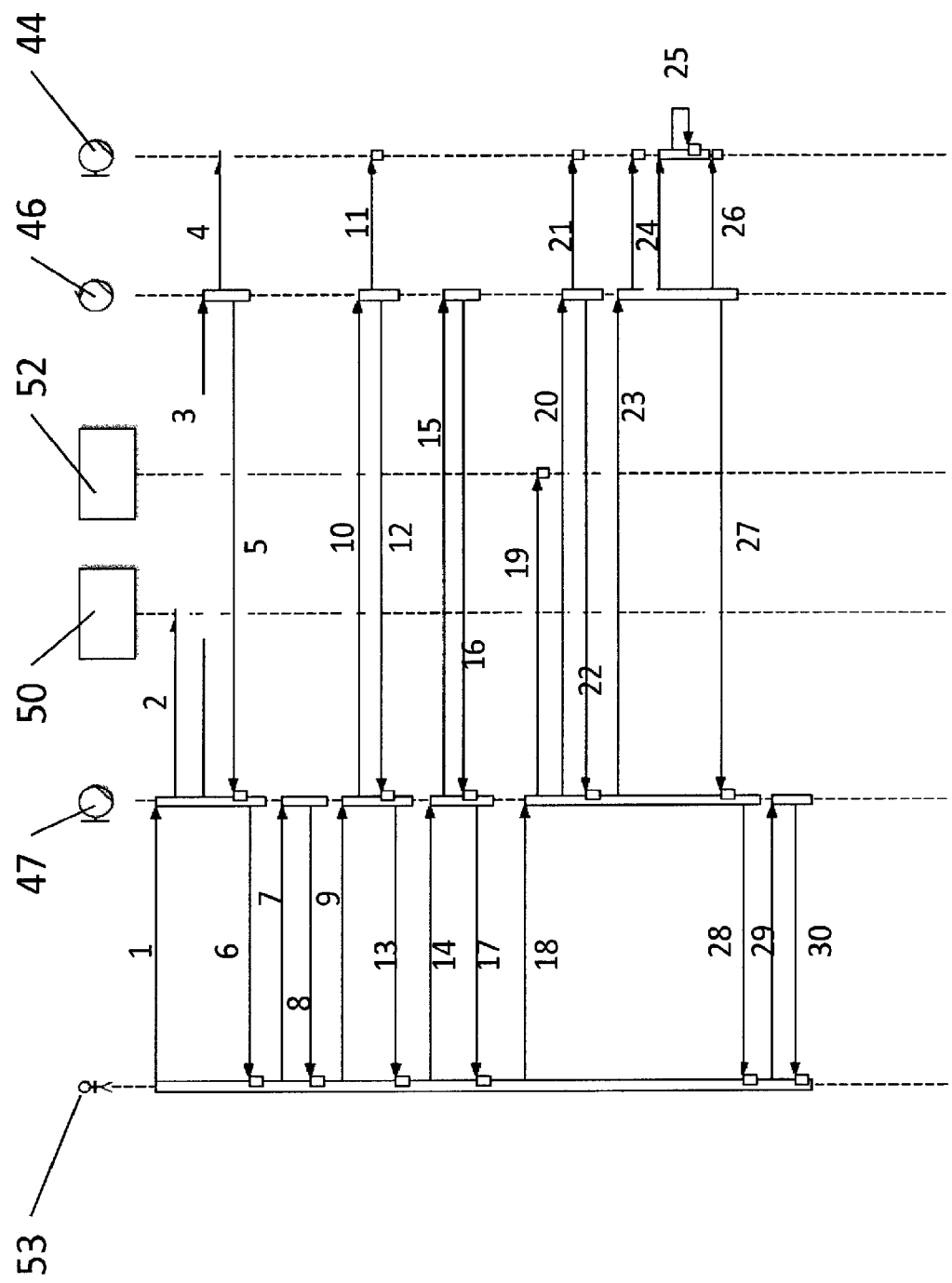

There are shown:

FIG. 1 schematically, an electrical switchgear system;

FIG. 2 schematically, a spatial arrangement of the electrical switchgear system and of a protected operator location; and FIG. 3 schematically, a flowchart of the method in accordance with the invention.

Components which are the same or which have the same effect are provided with the same reference numerals in the following description.

The general principle of a method of operating an electrical switching device within an electrical switchgear system will be explained with reference to the Figures in the following.

An electrical switchgear system 41 in the medium voltage range is assumed by way of example here that serves for the delivery and/or distribution of the supplied medium voltage to downstream networks and/or consumers. Such an electrical switchgear system 41 comprises a plurality of functional units 42 that are arranged in cabinet-like housings or housing modules 43. Different components are arranged in the functional units 42, in particular electrical switching devices 44 are accommodated, for controlling and regulating the switchgear system 41. They are, for example, circuit breakers, cut-off switches, grounding switches, breakers and/or transducers. The switchgear system 41, the functional units 42, and the electrical switching devices 44 are electrically connected to one another and to the medium voltage network via only schematically shown busbars and lines 45.

The electrical switching devices 44 are connected to a centrally arranged electrical control device 46 to be able to exchange data and to be able to trigger switching actions. The control device 46 can furthermore control status displays (not shown) in the housing 43 and, on the other hand, can communicate wirelessly with mobile electrical devices 47 such as tablets or smartphones. There are wireless control components and software solutions as well as corresponding application programs that are installed both on the mobile electrical devices 47 and in the electrical control devices 46 for the data processing connection of the mobile electrical devices 47 to electrical switching devices 44. The wireless exchange of information can e.g. take place by means of wireless LAN, Bluetooth, or NFC. Optionally, the switching devices 44 can also be manually actuated via operating elements 48 arranged in the functional units 42.

The electrical switchgear system 41 including the electrical switching devices 44 is set up in a corresponding control room 49. An identification means 50 in the form of a first QR code is installed at the outside at the housing 43 of a plurality of, and in particular all of, the electrical switching devices 44. In addition, the switching devices 44 can have a rating plate (not shown) comprising device-specific and/or system-specific data. Furthermore, a further identification means 52 in the form of a second QR code is installed in the control room 49 at an operator location 51 that is located outside the respective switching device 44.

A possible sequence of the method will be described in the following with reference to FIG. 3 and to the following steps numbered in order.

1-An operator 53 selects the electrical switching device 44 of the electrical switchgear system 41 to be operated on his mobile electrical device 47
2. -Reading the first identification means 50 of the selected electrical switching device 44.
3-Optionally reading the device/system information from the rating plate)
4-The control device 46 of the electrical switching device 44 reads the device status
5-Feedback on the part of the control device 46 to the mobile electrical device 47 with rating plate information and device status
6-Display of rating plate information and device status on the display of the mobile electrical device 47
7-Confirmation of the operator 53 on the mobile electrical device 47 on the correct selection of the electrical switching device 44
8-The mobile electrical device 47 prepares a menu (overview) with possible commands and/or switching actions by means of his application program (app)
9-The operator 53 selects the command to be executed
10-The mobile electrical device 47 again requests the device status from the control device 46 of the electrical switching device 44
11-The control device 46 reads the device status of the electrical switching device 44
12-The control device 46 sends the device status back to the mobile electrical device 47
13-The mobile electrical device 47 shows the menu with the device status
14-The operator 53 confirms the selected command
15-The mobile electrical device 47 sends a block of other commands and/or switching actions to the control device 46
16-The control device 46 confirms the block to the mobile electrical device 47
17-The mobile electrical device 47 prompts the operator 53 to change position to the safe operator location 51
18-Confirmation of the operator location 51 and triggering of the switching action by:
19-Reading the second identification means 52 at the operator location 51
20-Automatic validation of the safe operator location 51 by the mobile electrical device 47 to the control device 46
21-The control device 46 reads the device status of the electrical switching device 44
22-Confirmation from the control device 46 to the mobile electrical device 47 on safe operator location 51 and device status
23-The mobile electrical device 47 sends the command to execute the switching action to the control device 46
24-The control device 46 reads the device status of the electrical switching device 44 and sends a command to the electrical switching device 44
25-Execution of the switching action by the electrical switching device 44
26-After the switching action the control device 46 again reads the device status
27-The control device 46 sends the new device status back to the mobile electrical device 47
28-Display of the new device status on the display of the mobile electrical device 47
29-The operator closes the control menu of the mobile electrical device 47
30-Automatic display of possible actions on the part of the mobile electrical device 47.

Subsequently, further switching actions can be executed at the same electrical switching device 44 or at different electrical switching devices 44 by the mobile electrical device 47.

The above description of the embodiment serves only for illustrative purposes and not for the purpose of restricting the invention. Various changes and modifications are possible within the framework of the invention without going beyond the extent of the invention or its equivalents.

The invention claimed is:

1. A method of operating an electrical switching device within an electrical switchgear system by an operator by means of a mobile electrical device that communicates wirelessly with the electrical switching device,
the method comprising:
in a first step, the operator reads a first identification means by means of the mobile electrical device to unambiguously identify the electrical switching device to be operated;
in a second step, the operator reads a second identification means by means of the mobile electrical device to unambiguously identify a protected operator location; and
in a third step, the operator is authorized to operate the identified electrical switching device by means of the mobile electrical device when he is located at the identified operator location.

2. The method of operating an electrical switching device in accordance with claim 1,
wherein the execution of at least one of commands and switching actions can only take place if the operator has identified himself at the protected operator location by reading the second identification means arranged and associated there into the mobile electrical device.

3. The method of operating an electrical switching device in accordance with claim 1,
wherein feedback is sent to the mobile electrical device after a data processing connection has been established between the mobile electrical device and the electrical switching device that at least includes at least one of references and status of the electrical switching device.

4. The method of operating an electrical switching device in accordance with claim 1,
wherein at least one of commands and switching actions of further operators are blocked on the execution of at least one of commands and switching actions.

5. The method of operating an electrical switching device in accordance with claim 1,
wherein a repeated status query of the switching device after reading the second identification means enables a report on a status change within the time period between the two identification steps.

6. The method of operating an electrical switching device in accordance with claim 1,
wherein at least one of wireless transmission techniques, wireless control components, and application programs is used for the data processing connection of the mobile electrical device and the electrical switching device.

7. The method of operating an electrical switching device in accordance with claim 1,
wherein the identification of the electrical switching device and of the operating location takes place by identification means that include at least one of device-specific data and system-specific data.

8. The method of operating an electrical switching device in accordance with claim 1,
wherein the identification means are formed as QR codes.

9. The method of operating an electrical switching device in accordance with claim 1,
   wherein the spatial association of the operator with the electrical switching device and with the operator location takes place by position determination methods.

10. The method of operating an electrical switching device in accordance with claim 1,
    wherein the mobile electrical device has different access authorizations for different operators.

* * * * *